(12) United States Patent
Guertler et al.

(10) Patent No.: US 7,577,672 B2
(45) Date of Patent: Aug. 18, 2009

(54) SYSTEMS AND METHODS FOR PROVIDING A PORTAL INCLUDING MULTIPLE WINDOWS

(75) Inventors: Jochen Guertler, Karlsruhe (DE); Timo Lakner, Karlsruhe (DE); Oren Root, Kfar Ben-Nun (IL); Amir Glatt, Tel Avia (IL)

(73) Assignee: SAP AG, Walldorf (DE)

( * ) Notice: Subject to any disclaimer, the term of this patent is extended or adjusted under 35 U.S.C. 154(b) by 366 days.

(21) Appl. No.: 11/371,012

(22) Filed: Mar. 9, 2006

(65) Prior Publication Data
US 2007/0214420 A1  Sep. 13, 2007

(51) Int. Cl.
G06F 7/00 (2006.01)
G06F 17/00 (2006.01)
G06F 3/00 (2006.01)

(52) U.S. Cl. .............................. 707/100; 715/742
(58) Field of Classification Search ............ 707/100; 715/742
See application file for complete search history.

(56) References Cited

U.S. PATENT DOCUMENTS

2006/0036954 A1* 2/2006 Satyadas et al. ............ 715/742
2006/0080612 A1* 4/2006 Hayes et al. ............... 715/742
2006/0089990 A1* 4/2006 Ng et al. .................... 709/227

OTHER PUBLICATIONS

Web Services for Remote Portlets Specifcation 1.0, OASIS, published Sep. 2003.*

* cited by examiner

Primary Examiner—James Trujillo
Assistant Examiner—Jeffrey A Burke
(74) Attorney, Agent, or Firm—Mintz, Levin, Cohn, Ferris, Glovsky and Popeo, P.C.

(57) ABSTRACT

The present invention provides methods and apparatus, including computer program products, for providing a portal having a plurality of portlets providing information from an application. Methods and apparatus, including computer program products, are provided for providing a portal including a first portlet and a second portlet, each of which retrieves information from a service or an application. In one exemplary embodiment, the method may include receiving, at the portal, a first response from the first portlet, the first response including a first portion of information from an application, the first portion of information retrieved by the first portlet based on metadata describing the application; receiving, at the portal, a second response from the second portlet, the second response including a second portion of information from the application, the second portion of information retrieved by the second portlet based on metadata describing the application; and generating a page for the portal, the page including the first portion of information and the second portion of information retrieved by the first and second portlets from the application.

16 Claims, 6 Drawing Sheets

SYSTEMS AND METHODS FOR PROVIDING A PORTAL INCLUDING MULTIPLE WINDOWS

DESCRIPTION OF THE INVENTION

1 Field

The present invention generally relates to data processing. More particularly, the present invention relates to providing a portal having a plurality of windows displaying information from an application.

2 Background

Advances or changes in how enterprises conduct business result from, for example, growing competition and globalization, mergers and acquisition, or a revamping of business models. Successful advances and changes often depend on how quickly the enterprise's information technology (IT) organization adapts to evolving business needs.

For organizations to enable business advances and changes, they must ensure that enterprise applications are not only high-performance business engines driving efficiencies, but also that the applications become flexible building blocks of future business systems. Recently, building blocks have taken the form of "services." A service, such as a Web service, may be implemented as a software application (also referred to as "application") which may be called by another application to provide a service over a network, such as the Internet. A service represents a self-contained, self-describing piece of application (also referred to as a "program") functionality that can be found and called by other applications. A service may be self-contained because the application calling the service does not have to depend on anything other than the service itself, and may be self-describing because all the information on how to use the service can be obtained from the service itself. To interact with a service, a client system may make a call, such as a Simple Object Access Protocol (SOAP) call, to the service. The call may include sending a message, such as a SOAP message formatted in accordance with a WSDL (Web Services Definition Language) document describing the service.

In some cases, the client system may include a user interface, such as a Web browser (also referred to as a browser), to present content from a portal (also referred to as a Web portal) at a server. A Web browser (e.g., Netscape Navigator™) is an application used to locate and present content, such as a Web page. A Web page (also referred to as a page) is a document generated for presentation by a browser. Often, a page is generated using code, such as a markup language like the HyperText Markup Language (HTML). A portal is an application that aggregates content from one or more services. The web site www.yahoo.com is an example of portal since it aggregates content from one or more services, such as e-mail, weather, stock quotes, searching, on-line shopping, and the like. The portal aggregates content by generating a Web page, which is provided to a browser for presentation. To a user, the Web page of aggregated content appears as multiple windows in a browser, with each window providing content from one of the services.

The portal may include "portlets." A portlet is an application (or component of an application) that processes requests for content and retrieves content. A portlet may retrieve content from a service and provide the content to the portal. Multiple portlets may also be used to retrieve content from different services, such as services providing e-mail, weather, stock quotes, searching, on-line shopping. When multiple portlets are used, the content from each of the portlets are displayed in one of the windows of a page presented by a browser. The portal may also provide some functions to the portlets, such as the ability to customize the content provided by the portlet, to customize the appearance of the content provided by the portlet, and to customize the positioning of the portlet within the portal. Java community standard JSR-168 titled, Portlet Specification (Final Release), 27 Oct. 2003 (available at jcp.org) describes an example of a portlet. Other examples have been implemented as well, including the software technology referred to as "iViews" (commercially available from SAP AG, Walldorf, Germany).

From the perspective of the portal, a service is a so-called "black box" since the portlet hides (or wraps) functional details (e.g., information regarding components and interfaces) of the service. Because the portlet treats the service as a single black-box, some of the customization functions offered by the portal may not be available for use with the service. There is thus a need to improve the way a portlet provides to a portal content from a service.

SUMMARY OF THE INVENTION

The present invention provides methods and apparatus, including computer program products, for providing a portal having a plurality of portlets providing information from an application.

In one exemplary embodiment, there is provided a method for providing a portal including a first portlet and a second portlet. The method may include receiving, at the portal, a first response from the first portlet, the first response including a first portion of information from an application, the first portion of information retrieved by the first portlet based on metadata describing the application; receiving, at the portal, a second response from the second portlet, the second response including a second portion of information from the application, the second portion of information retrieved by the second portlet based on metadata describing the application; and generating a page for the portal, the page including the first portion of information and the second portion of information retrieved by the first and second portlets from the application.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of implementations consistent with the present invention and, together with the description, help explain some of the principles associated with the invention. In the drawings.

DETAILED DESCRIPTION

Reference will now be made in detail to the invention, examples of which are illustrated in the accompanying drawings. The implementations set forth in the following description do not represent all implementations consistent with the claimed invention. Instead, they are merely some examples consistent with certain aspects related to the invention. Wherever possible, the same reference numbers will be used throughout the drawings to refer to the same or like parts.

Figure 1A:
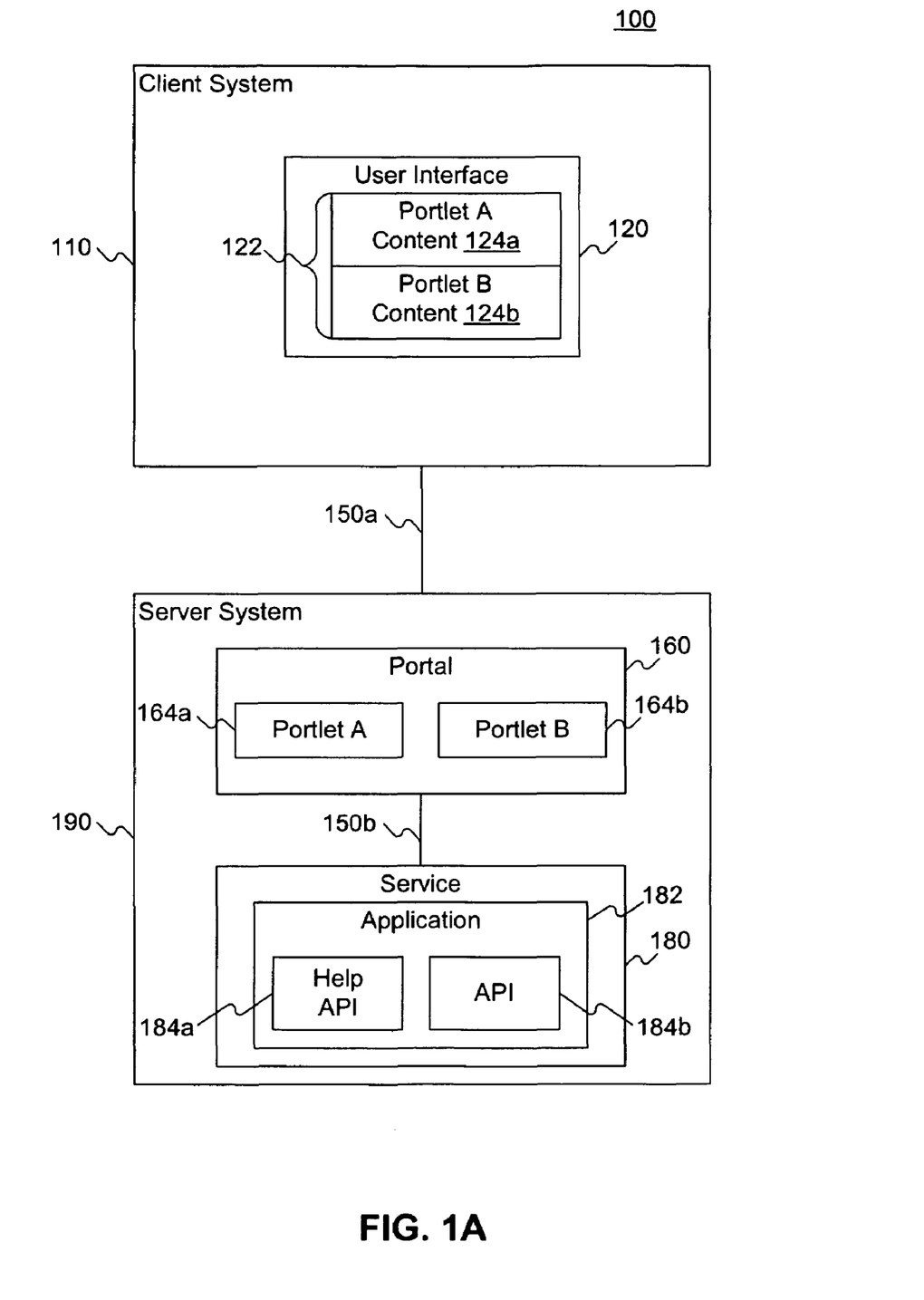
FIG. 1A illustrates a block diagram of an exemplary system environment consistent with certain aspects related to the present invention.

FIG. 1A is a block diagram of an exemplary system 100 environment in which systems and methods consistent with the invention may be implemented. System 100 includes a client system 110 and a server system 190. The client system 110 may be implemented as a processor, such as a computer. Client system 110 may include a user interface 120 for presenting content, such as data, associated with a service 180. The user interface 120 may be an application that interfaces with service 180 and an application 182. Moreover, user interface 120 may present content within windows 122. For example, user interface 120 may be implemented as a browser capable of presenting within windows 122 content from (or providing content to) service 180 and/or application 182. Windows 122 represent display areas presented by user interface 120. Windows 122 may include a first portion of content 124a retrieved by a first portlet 164a and a second portion of content 124b retrieved by a second portlet 164b.

To present content at user interface 120, user interface 120 may call portal 160 at server system 190 to request content from a service, such as service 180. The call may be in the form of a message, such as a Simple Object Access Protocol (SOAP) request message through a network connection 150a. Network connections 150a-b may be implemented as a network, such as the Internet or an intranet, although any other communication mechanism may be used to provide communications.

Server system 190 may be implemented as a processor, such as a computer. The server system 190 may include a portal, such as portal 160, and a service, such as service 180. The portal 160 may further include portlets, such as first portlet 164a and second portlet 164b. The first portlet 164a may be configured to retrieve a first portion of content information from service 180 and/or application 182, while second portlet 164b may be configured to retrieve a second portion of content information from service 180 and/or application 182.

Service 180 may be implemented as a service, such as a Web service, which may be called by using, for example, a SOAP message. Service 180 may be implemented as an application (e.g., application 182) that provides a service when called. Examples of applications include e-mail, database programs, word processors, programs for providing stock quotes, and programs for providing weather, although other applications may be used as well.

Application 182 may include components, such as interfaces 184a-b. Interfaces 184 may be implemented as an API (Application Program Interface), which can be called by, for example, a portlet. When called, an interface, such as interface 184a, may instantiate a component, such as an object. An "object" means a bundle of variables (e.g., data) and related methods accessed by software. In object-oriented programming, an object is a concrete realization (instance) of a class that consists of data and the operations associated with that data. Interface 184a may be an interface that provides access to a portion of application 182 by allowing access to components of application 182. For example, when called by portlet 164a, interface 184a may instantiate a help object, so that portlet 164a can retrieve help information associated with application 182. The interface 184b may instantiate another object to provide access to information content from another portion of application 182.

The content retrieved from application 182 by the portlets, is provided to a portal, such as portal 160. Portal 160 aggregates any content retrieved by the first and second portlets 164 and then provides the aggregated content to user interface 120 for presentation. Moreover, portal 160, including first and second portlets 164, may each be implemented as code, such as XML or HTML. The code may be composed using metadata describing components of application 182 or service 180. Specifically, the code may use metadata describing an interface or object of the application or service to allow a portlet, such as portlet 164a, to retrieve content from the application or service. For example, portlet 164a may include metadata that describes the name of an API at application 182, so that portlet 164a can access the API to retrieve content from application 182. Meanwhile, second portlet 164b may also include code composed using metadata to allow second portlet 164a to retrieve content from another interface and/or object at application 182. By using metadata describing the components of an application or service, the first and second portlets may each access different components of the same application (or service) to retrieve different content. The portal, such as portal 160, may then aggregate the content provided by each of the portlets, such as portlets 164. The portal, such as portal 160, may then send for presentation the aggregated content to a user interface, such as user interface 120.

System 100 may be implemented as part of an enterprise services framework (ESF). An enterprise services framework is a type of computer framework, such as a client-server architectural framework, that includes one or more services. The services are accessible to other parts of the ESF, such as client systems and their corresponding users, through a communication mechanism such as the Internet or an intranet. The ESF may be constructed using tools provided by SAP NetWeaver™ (commercially available from SAP AG, Walldorf, Germany). Although FIG. 1A shows a single client system 110 and a single server system 190, a plurality of client systems and server systems may be used. Moreover, the elements depicted in FIG. 1A may be at other locations as well as distribute among multiple locations. Although FIG. 1A is described with respect to a client-server architecture and an ESF, system 100 can also use any other architecture or framework. Although a service may be made available through the Internet, services may also be made available from through an intranet or any other communication mechanism. Moreover, although FIG. 1A depicts server 180 implemented within server 190, server 180 may be located at other servers as well.

Figure 1B:
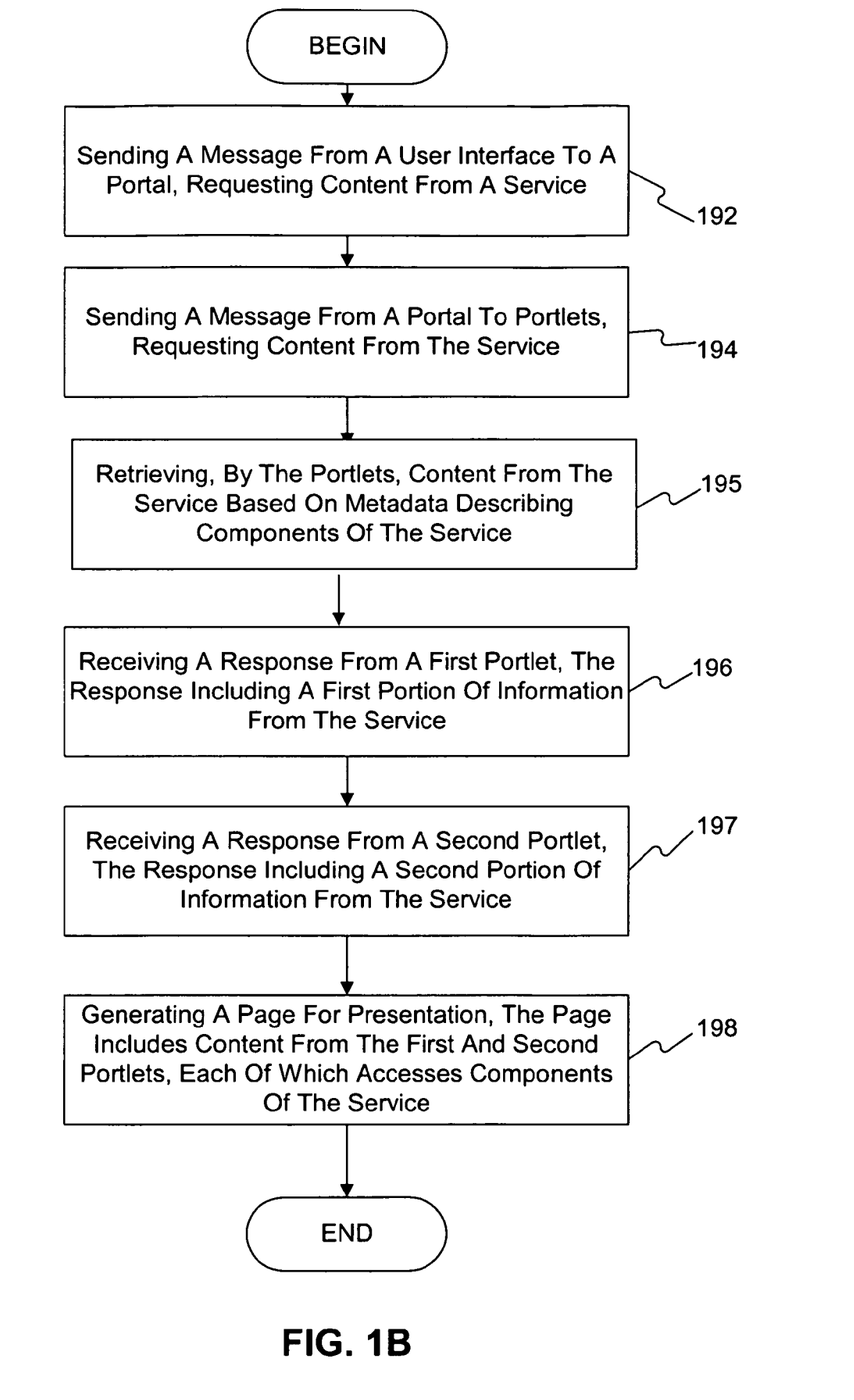
FIG. 1B depicts a flowchart with steps for generating a page composed using several portlets consistent with certain aspects related to the present invention.

FIG. 1B depicts a flowchart for generating content retrieved by portlets accessing components of the same service (or application). Referring to FIGS. 1A and 1B, when a user seeks to interact with service 180 or application 182, user interface 120 may call portal 160 to request content from service 180 and/or application 182 (step 192). The call may be a message, such as a SOAP message or Remote Procedure Call (RPC), sent through network connection 150a.

When portal 160 receives the call, portal 160 may then call first and second portlets 164, requesting a retrieval of content from service 180 and/or application 182 (step 194). The first and second portlets 164 each retrieve content from their components of application 182 (or service 180) based on metadata describing the components (step 195). For example, the metadata may describe components of application 182, such as its interfaces 184. Based on the metadata, first portlet 164a may, for example, retrieve information, such as help information, by accessing interface 164a, while second portlet 164b may retrieve information, such as a menu tool bar, by accessing interface 164b.

After portlets 164 retrieve content from service 180 and/or its application 182, portal 160 may then receive a response from first portlet 164 (step 196). The response may include information associated with a component of application 182, such as interface 164a. Portal 160 may also receive from second portlet 164b a response including information associated with another component of application 182, such as interface 164b (step 197). When portal 160 receives responses from portlets 164, portal 160 aggregates the content by generating a page, including the content retrieved by each of the first and second portlets 164 from the components of application 182 (step 198). The page is sent to user interface 120 for presentation.

To a user, the page presented by the user interface appears as a first window 124a depicting the content retrieved by first portlet 164a and a second window 124b depicting the content retrieved by second portlet 164b. By using metadata describing components of application 182 (or service 180), first portlet 164a may call interface 164a to retrieve a portion information associated with application 182. Meanwhile, second portlet 164b may call another interface by sending a message to interface 184b to retrieve another portion of information associated with application 182. Because the portlets may each access different components of the same application rather than the application as a whole, the application may no longer be considered a so-called black-box. As such, additional portal functions, such as rearranging portlets within the portal, may be used with the application (or service).

When retrieving content, portlets 164 may be implemented consistently with standard mechanisms, such as Web Services for Remote Portlets (WSRP). Web Services for Remote Portlets version 1.0, dated August 2003 is a standard ("the WSRP standard") for portals and portlets. The WSRP standard is available through www.oasis-open.org.

Figure 2:
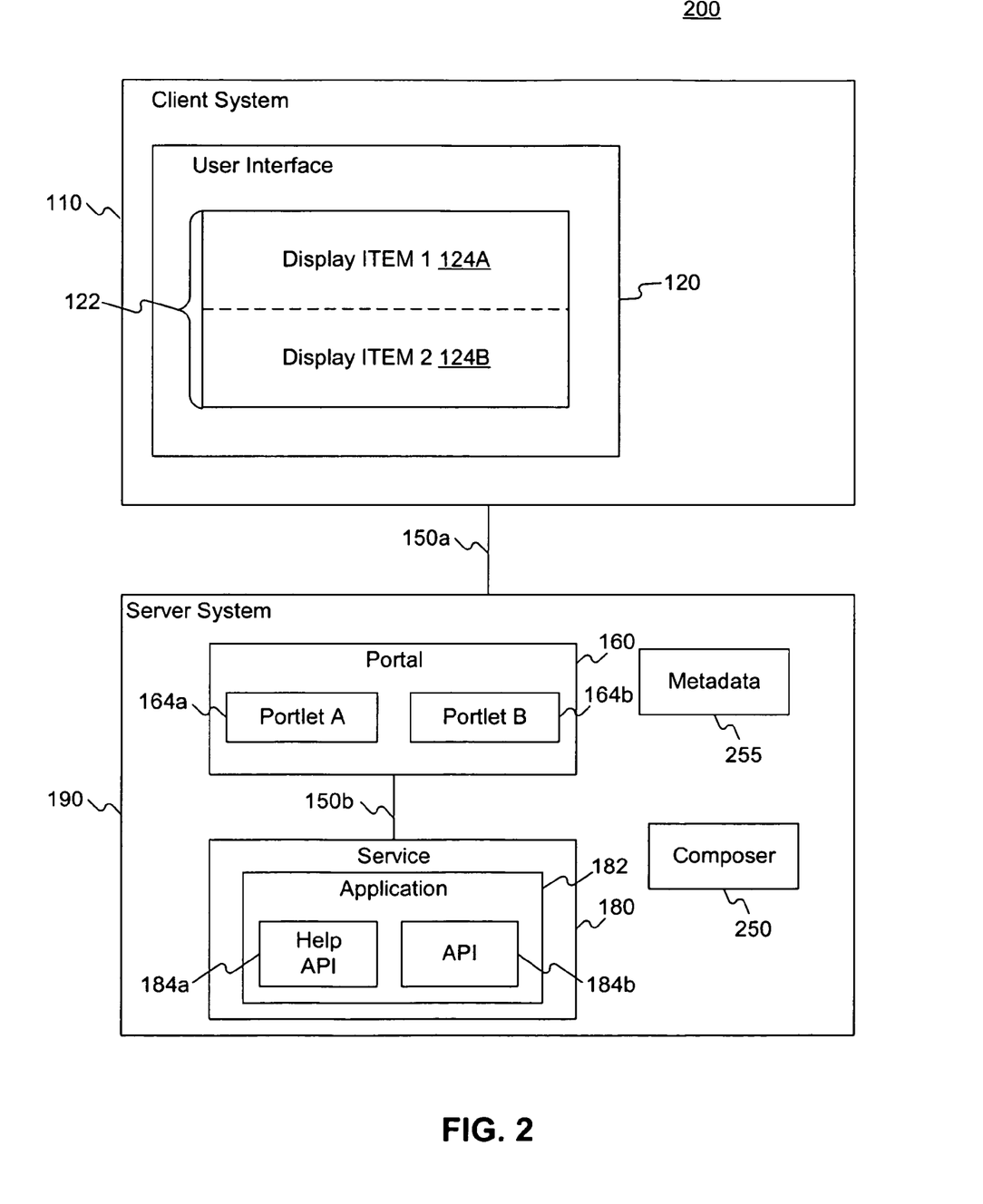
FIG. 2 depicts another block diagram of an exemplary system for displaying a single application using a plurality of portlets consistent with certain aspects related to the present invention.

FIG. 2 depicts another block diagram of a system 200 environment in which systems and methods consistent with the invention may be implemented. System 100 is similar to FIG. 1 in some respects. However, FIG. 2 also depicts a metadata 255 and a composer 250.

Server system 190 may include metadata 255 for providing metadata representing application 182 (or service 180). For example, metadata 255 may describe application 182 including components of application 182, such as the interfaces and objects of application 182. Metadata 255 may also describe how to make an API call to interface 184a by including the name of the API and the input and output parameters associated with the API. Moreover, application 182 may register which interfaces and/or objects are available to a portlet. For example, JNDI (Java Naming and Directory Interface) may be used to access the names of the interfaces and/or objects that application 182 makes available to portlets. The registered interfaces and objects may also serve as metadata describing the application or service. Although FIG. 2 depicts metadata 255 included within server system 190, metadata 255 may be included at other locations (e.g., client 110).

Server system 190 also includes composer 250 for composing pages. For example, composer 250 may compose a page of HTML or XML (Extensible Markup Language) defining the composition of portal 160 including portlets 164. Composer 250 may be implemented as a utility (e.g., a wizard) to assist a user to perform the task of composing the layout of a page of HTML. Moreover, composer 250 may use metadata 255 describing the components (e.g., the interfaces and objects) of application 182 (or service 180) when composing the page of HTML. The composed page of HTML serves as a "model" of the windows presented by user interface 120 during runtime. The model may then be stored. During runtime, composer 250 may build a page of content by binding the stored model and content information provided by portlets 164. The page may thus include windows having content from a plurality of portlets, each of which represents a portion of a single application (or service).

During the design of service 180 or application 182, a user may define what components of the service or application may be made available to a portlet. For example, when service 180 and application 182 are developed, components of service 180 or application 182 may be made available to portlets. For example, if an application provides a catalog service for displaying items in a catalog, the application may include metadata indicating what components of the application are available to a portlet. The catalog application may, for example, allow a portlet to access a credit card charge object for processing credit cards and allow another portlet to access a display object for displaying products associated with the catalog. When a page of HTML or XML is composed to form a model, the model may include the name and location of the credit card charge object as well as the name and location of the display object, so that at runtime those objects may be called by portlets to retrieve content information from the same catalog application.

Figure 3:
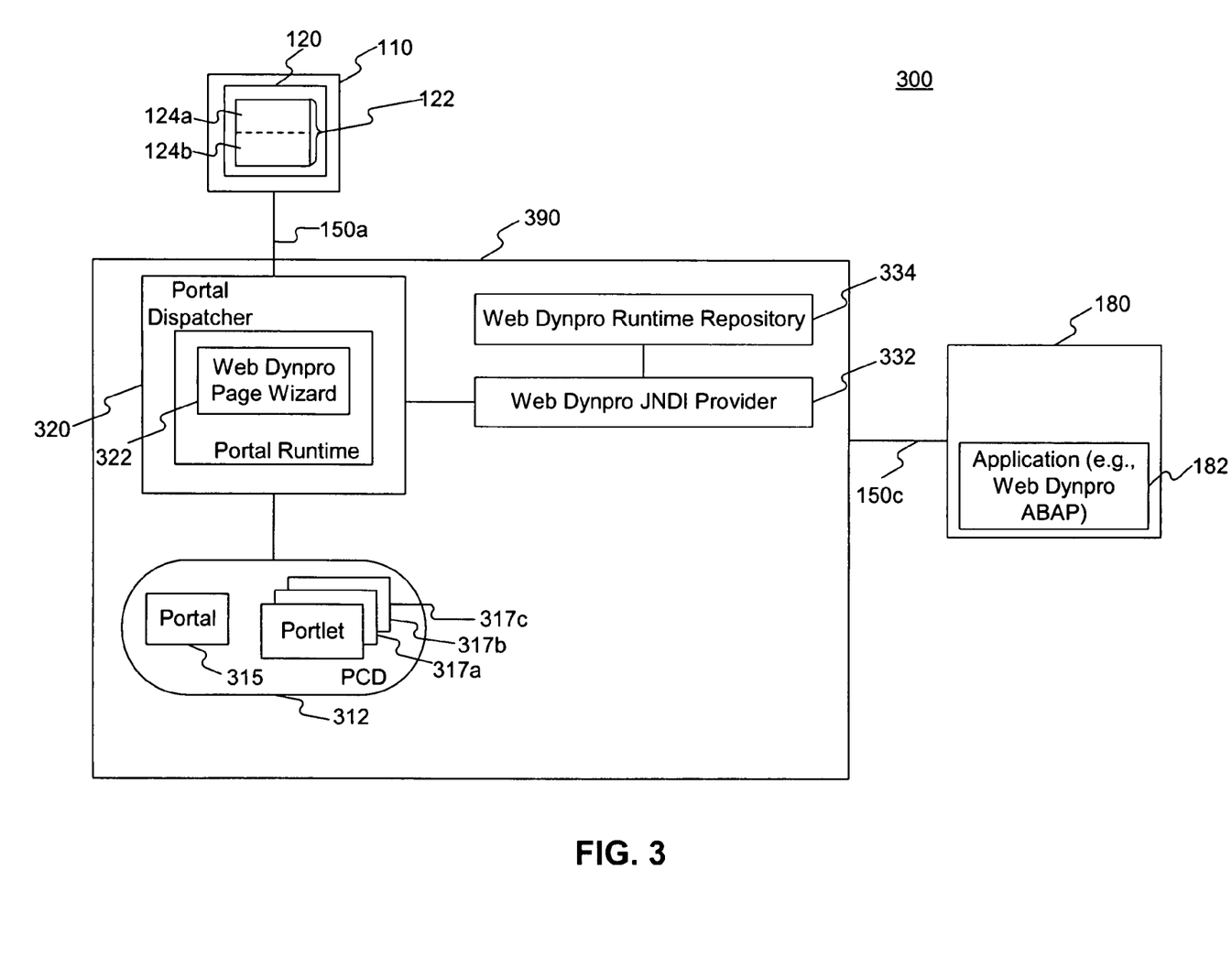
FIG. 3 depicts a block diagram of an exemplary design time environment for displaying a single application using a plurality of portlets consistent with certain aspects related to the present invention.

FIG. 3 depicts another system environment 300 in which systems and methods consistent with the invention may be implemented. System 300 includes client system 110 and a server system 390 for composing code, such as HTML, for a portal 315 and portlets 317 a-c. The portal content directory 312 includes the composed code for portals, such as portal 315, and portlets, such as portlets 317 a-c. At runtime, the composed code may define the identity of the portlets retrieving content and the layout of the content, so that user interface 120 can present the content to a user.

Server system 390 may include a portal dispatcher module 320, a JNDI provider 332, a repository 334, and page content directory 312. Server system 390 may be implemented in any framework, such as SAP's NetWeaver framework (commercially available from SAP, AG) and may be compatible with J2EE (Java 2 Platform Enterprise Edition). Moreover, the framework may include a database, centralized services (e.g., a message service, a queue service, a buffer, and the like), a dispatcher, a process manager, and a software delivery manager.

Portal dispatcher 320 may control one or more portlets 417. For example, during runtime, portal dispatcher 320 may manage messages to and/or from portlets 417. Portal dispatcher 320 may also include a page wizard 322. Page wizard 322 is a utility for assisting a user to perform the task of composing code, such as HTML. The composed code may define (or model) the content and layout of a page. For example, a page may define a page of portal 315 including its portlets 317 a-c. At runtime, the code generates a page for presentation by user interface 120. Page wizard 322 is similar in some respects to composer 250. However, page wizard 322 includes a so-called "wizard" utility to assist a user when composing the code for portal 315 and portlets 317 *a-c*. Page wizard 322 may also access metadata identified by JNDI provider 332. Although other page wizards may be used to compose code, in one implementation, a commercially available page wizard from SAP's Web Dynpro may be used.

Figure 4:
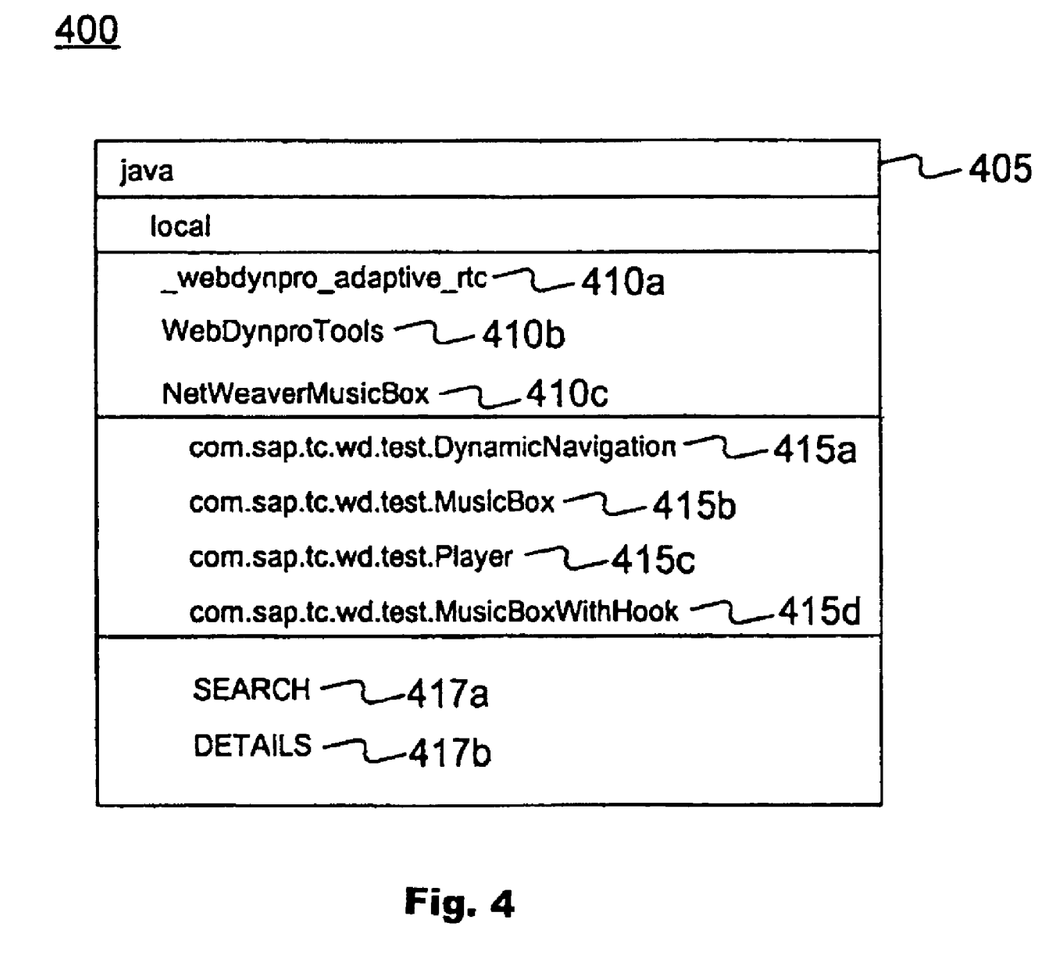
FIG. 4 depicts exemplary metadata for use when composing a page consistent with certain aspects related to the present invention.

JNDI provider 332 may provide an interface, which may be called to access metadata in a name directory. Application 182 or service 180 may register in a name directory its internal components, such as names and locations of interfaces, names and locations of objects, and names and locations of other internal components. The registration of the internal components provides page wizard 322 with access to metadata describing application 182 or service 180. The JNDI provider 332 may also store the metadata data information at runtime repository 334 Runtime repository may store information regarding the application or service; that information may include a list of applications which may be accessed using portlets. FIG. 4 depicts an example of metadata information 400 provided by JNDI provider 332. The metadata information 400 provided by JNDI provider 332 may include the operating environment information (e.g., JAVA 405) of a service (or application) as well as any archives of services 410*a-c* registered at JNDI provider 332. NetWeaverMusicBox 410*c* is an example of the name of an archived service registered at JNDI provider 332. The names at 415*a-d* represent applications that are accessible, and 417*a-b* represent two portlets associated with application 415*d*.

When page wizard 322 (FIG. 3) composes code for a portal including a plurality of portlets, page wizard 322 may receive metadata, such as the metadata 400 from JNDI provider 332. The metadata 400 allows page wizard 322 to access the names of services (or applications), such as services 410*a-c* (FIG. 4), and the names of components, such as objects 415*a-d* or interfaces (not shown). For example, by using metadata 400, a first portlet may access Music Box 415*b* of NetWeaverMusicBox 410*c*, while a second portlet accesses Player 415*c* of NetWeaverMusicBox 410*c*. Moreover, the composed code for a portal may define the first and second portlets and the respective calls to the Music Box 415*b* and Player 415*c*.

Figure 5:
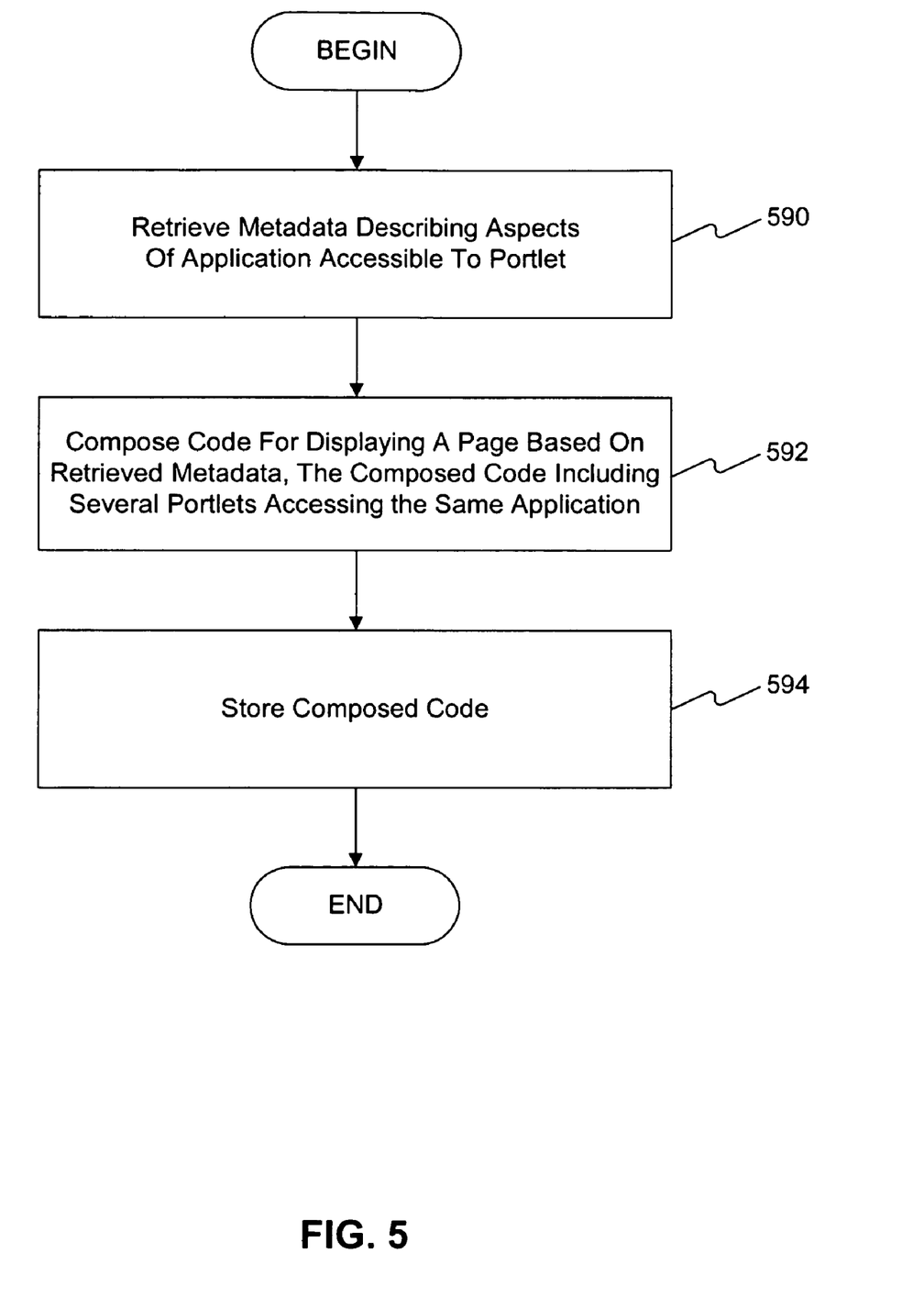
FIG. 5 depicts a flowchart with steps for composing a page having several portlets consistent with certain aspects related to the present invention.

FIG. 5 depicts the steps associated with composing a page of code having several portlets, each retrieving content from components of the same application, although such content retrieving may be performed from a service as well. Referring to FIGS. 3 and 5, page wizard 322 may retrieve from JNDI provider 332 metadata describing components of application 182 that may be accessed by portlets (step 590). Page wizard 322 may then use the retrieved metadata to select which portions of application 182 to access using a portlet and then compose a page of code using the selected portions of application 182 (step 592). For example, page wizard 322 may use the retrieved metadata to select an interface or object at application 182. The composed page of code may be stored at portal content directory 312 or in repository 334 (step 594). The stored page 315 may be used during runtime of application 182 to configure the layout of content information retrieved by the portlets from an application, so that the content information may be presented in windows 122.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments. Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A computer-readable storage medium containing instructions to configure a processor to perform a method for providing a portal, the portal including a first portlet and a second portlet, the method comprising:
   receiving, at the portal, a first response from the first portlet, the first response including a first portion of information from an application, the first portion of information retrieved by the first portlet based on metadata describing the application;
   receiving, at the portal, a second response from the second portlet, the second response including a second portion of information from the application, the second portion of information retrieved by the second portlet based on metadata describing the application, the application comprising a first interface accessible by the first portlet and a second interface accessible by the second portlet, the metadata describing the application comprising a first name of the first interface, an input parameter associated with the first interface, an output parameter associated with the first interface, a second name of the second interface, another input parameter associated with the second interface, and another output parameter associated with the second interface, the first interface and the second interfaces being separate interfaces; and
   generating a page for the portal, the page including a first window presenting the first portion of information retrieved by the first portlet and a second window presenting the second portion of information retrieved by the second portlet from the application.

2. The computer-readable storage medium of claim 1, wherein receiving the first response comprises: receiving the first response as a Simple Object Access Protocol (SOAP) message.

3. The computer-readable storage medium of claim 1, comprising: providing, by the application, the metadata to a registry.

4. The computer-readable storage medium of claim 1, comprising:
including the application in a service accessible from a network.

5. The computer-readable storage medium of claim 1, wherein instantiating comprises: instantiating the first and second interfaces as the same interface.

6. The computer-readable storage medium of claim 1, comprising:
generating the metadata describing the application, such that the metadata describes the first and second interfaces.

7. A method for providing a portal, the portal including a first portlet and a second portlet, the method comprising:
receiving, at the portal, a first response from the first portlet, the first response including a first portion of information from an application, the first portion of information retrieved by the first portlet based on metadata describing the application;
receiving, at the portal, a second response from the second portlet, the second response including a second portion of information from the application, the second portion of information retrieved by the second portlet based on metadata describing the application, the application comprising a first interface accessible by the first portlet and a second interface accessible by the second portlet, the metadata describing the application comprising a first name of the first interface, an input parameter associated with the first interface, an output parameter associated with the first interface, a second name of the second interface, another input parameter associated with the second interface, and another output parameter associated with the second interface, the first interface and the second interfaces being separate interfaces; and
generating a page for the portal, the page including a first window presenting the first portion of information retrieved by the first portlet and a second window presenting the second portion of information retrieved by the second portlet from the application.

8. The method of claim 7, wherein receiving the first response comprises:
receiving the first response as a Simple Object Access Protocol (SOAP) message.

9. The method of claim 7, comprising:
providing, by the application, the metadata to a registry.

10. The method of claim 7, comprising:
including the application in a service accessible from a network.

11. The method of claim 7, wherein instantiating comprises:
instantiating the first and second interfaces as the same interface.

12. The method of claim 7, comprising: generating the metadata describing the application, such that the metadata describes the first and second interfaces.

13. A system, comprising:
a processor; and
a memory, wherein the processor and the memory are configured to perform a method comprising:
receiving, at a portal, a first response from a first portlet, the first response including a first portion of information from an application, the first portion of information retrieved by the first portlet based on metadata describing the application;
receiving, at the portal, a second response from a second portlet, the second response including a second portion of information from the application, the second portion of information retrieved by the second portlet based on metadata describing the application, the application comprising a first interface accessible by the first portlet and a second interface accessible by the second portlet, the metadata describing the application comprising a first name of the first interface, an input parameter associated with the first interface, an output parameter associated with the first interface, a second name of the second interface, another input parameter associated with the second interface, and another output parameter associated with the second interface, the first interface and the second interfaces being separate interfaces; and
generating a page for the portal, the page including a first window presenting the first portion of information retrieved by the first portlet and a second window presenting the second portion of information retrieved by the second portlet from the application.

14. The system of claim 13, wherein receiving the first response comprises:
receiving the first response as a Simple Object Access Protocol (SOAP) message.

15. The system of claim 13, comprising:
providing, by the application, the metadata to a registry.

16. The system of claim 13, comprising:
including the application in a service accessible from a network.

* * * * *

UNITED STATES PATENT AND TRADEMARK OFFICE
CERTIFICATE OF CORRECTION

PATENT NO. : 7,577,672 B2  Page 1 of 1
APPLICATION NO. : 11/371012
DATED : August 18, 2009
INVENTOR(S) : Guertler et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 528 days.

Signed and Sealed this

Fourteenth Day of December, 2010

David J. Kappos
*Director of the United States Patent and Trademark Office*